US010016849B2

(12) United States Patent
Rotheut et al.

(10) Patent No.: US 10,016,849 B2
(45) Date of Patent: Jul. 10, 2018

(54) METHOD FOR WELDING A WELD-ON ELEMENT ONTO A COUNTERPART

(71) Applicant: Ford Global Technologies, LLC, Dearborn, MI (US)

(72) Inventors: Dietmar Rotheut, Eschweiler (DE); Gerald Kuehn, Pulheim (DE); Theodore John Coon, Livonia, MI (US); Jason Carter, Southgate, MI (US); Melissa Marie Brutto, New Boston, MI (US); David J. Lawrence, Wayne, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 648 days.

(21) Appl. No.: 14/161,202

(22) Filed: Jan. 22, 2014

(65) Prior Publication Data

US 2014/0131319 A1     May 15, 2014

Related U.S. Application Data

(63) Continuation of application No. PCT/EP2012/063943, filed on Jul. 17, 2012.

(30) Foreign Application Priority Data

Jul. 22, 2011  (DE) .................. 10 2011 079 679

(51) Int. Cl.
| B23K 35/02 | (2006.01) |
|---|---|
| B23K 35/36 | (2006.01) |
| B23K 9/20 | (2006.01) |
| B23K 9/235 | (2006.01) |

(52) U.S. Cl.
CPC .............. *B23K 35/36* (2013.01); *B23K 9/201* (2013.01); *B23K 9/235* (2013.01)

(58) Field of Classification Search
CPC .. B23K 35/0261; B23K 35/36; B23K 35/365; B23K 35/0288; B23K 35/404; C10M 101/00
USPC .............................. 21/145.22, 74, 146.23, 72
See application file for complete search history.

(56) References Cited

U.S. PATENT DOCUMENTS

| 3,586,818 | A | * | 6/1971 | Blake ................... | B23K 35/224 219/136 |
|---|---|---|---|---|---|
| 3,950,629 | A | * | 4/1976 | Auzary ................. | B23K 9/285 219/122 |
| 4,071,734 | A | * | 1/1978 | Zarechensky ...... | B23K 35/3073 219/146.31 |
| 4,404,447 | A | * | 9/1983 | Kitamura ............. | B23K 11/063 219/64 |
| 4,532,403 | A | * | 7/1985 | Jordan ............... | B23K 15/0046 219/121.13 |
| 5,229,450 | A | * | 7/1993 | Van Buskirk ........ | C09D 133/06 428/461 |
| 5,233,160 | A | * | 8/1993 | Gordish ............... | B23K 35/368 219/137 WM |
| 5,349,152 | A | * | 9/1994 | Renner ................. | B23K 9/207 219/117.1 |
| 5,662,820 | A | * | 9/1997 | Schwiete ............. | B23K 9/202 219/98 |
| 6,429,402 | B1 | * | 8/2002 | Dixon .................. | B23K 26/34 219/121.63 |
| 6,762,392 | B1 | * | 7/2004 | Krengel ................ | B23K 9/20 219/130.5 |
| 6,815,631 | B2 | * | 11/2004 | Schmitt ................ | B23K 9/205 219/98 |
| 8,395,071 | B2 | * | 3/2013 | Panday ................ | B23K 35/36 219/137.2 |
| 2003/0019847 | A1 | * | 1/2003 | Schmitt ................ | B23K 9/205 219/99 |
| 2005/0044687 | A1 | * | 3/2005 | Matsuguchi ......... | B21C 37/042 29/455.1 |
| 2006/0096966 | A1 | * | 5/2006 | Munz ................. | B23K 35/0266 219/145.22 |
| 2008/0026967 | A1 | * | 1/2008 | Suda .................... | C10M 101/00 508/459 |
| 2009/0111723 | A1 | * | 4/2009 | Shibata ................. | B23H 1/08 508/463 |
| 2009/0294410 | A1 | * | 12/2009 | Iwase .................. | B21J 15/025 219/91.23 |
| 2011/0240604 | A1 | * | 10/2011 | Panday ................ | B23K 35/36 219/74 |
| 2013/0105445 | A1 | * | 5/2013 | Bertin .................. | B23K 9/025 219/74 |

* cited by examiner

*Primary Examiner* — Dana Ross
*Assistant Examiner* — Lawrence Samuels
(74) *Attorney, Agent, or Firm* — Burris Law, PLLC

(57) ABSTRACT

A method for welding a weld-on element onto a component is proposed, comprising at least the step that, before the welding process, at least one of the parts being connected is wetted with a wetting agent over the full area and uniformly in layer thickness in a welding region.

11 Claims, No Drawings

METHOD FOR WELDING A WELD-ON ELEMENT ONTO A COUNTERPART

CROSS-REFERENCE TO RELATED APPLICATIONS

This application is a continuation of International Application No. PCT/EP2012/063943, filed Jul. 17, 2012 which claims priority to German Patent Application No. 102011079679.7 filed Jul. 22, 2011; each of the entire contents of which is hereby incorporated by reference.

BACKGROUND OF THE INVENTION

The present invention relates to a method for welding a weld-on element, which has a weld-on end and a functional region arranged at a distance from the latter, onto a component, for example onto a vehicle panel.

Weld-on elements can be butt-welded onto components, for example metal panels, for example by what is known as arc welding. The function region of the weld-on elements projects from the components and may therefore hold various structural parts or components. In motor vehicle construction, for example, the weld-on elements may be placed with their weld-on end flush against a body panel or the like, welded to it, and be configured at their functional region so as to afford many different possibilities for holding various structural parts or components. The functional portion of each weld-on element is, in this case, variably designed so as to be adapted to the component to be held. For example, cable harnesses individual cables, lines, hoses and trim. The functional region may be configured in many different ways.

The arc welding method employed may be what is known as the lift-ignition welding method, as described for example in DE 199 25 628 A1.

Also known is the WELDFAST® welding method, in which weld-on elements, that is to say WELDFAST® holders as they are known commercially, are welded to a panel by arc welding. The WELDFAST® holders have the weld-on end and the functional region. However, it must be considered a disadvantage of the WELDFAST® holders that they have an elongated configuration at their weld-on ends, so as to form virtually a weld-on edge of a long extent. A specially configured welding appliance is required to reliably weld the weld-on elements to a panel. Welding defects may cause the welded-on weld-on element to fail. Welding parameters vary considerably on account of the elongated welding edge, thus making low-cost production difficult, since the welding parameters would always have to be continuously established and checked. The use of inert gas, intended for protecting the surrounding welding region from oxidation, also has the effect of increasing costs. For this purpose, a welding apparatus adapted to the WELDFAST® method has an inert-gas cover, which restricts free space.

In spite of the arc-stabilizing effect of argon as an inert gas, it has been observed that the arc is not always reproducibly stable, which has led to undesired instances of the panel being welded through or pierced. For example, it has been observed on weld-on elements with an elongated welding edge that arcs break away from certain portions of the welding edge but are maintained at other portions. Arcs pierce isolated points along the elongated area resulting in a weld of poor quality, which therefore has to be rejected. Poor or defective welds produced by arc welding methods, for example on the basis of the WELDFAST® system, can however only be spotted with great difficulty by means of automatic defect detection systems. Therefore, these welded connections are checked by manual visual inspections, and repaired by manual reworking, for example by applying welding or soldering filler to the location of the defect. This manual check with the additional requirement for manual repair is very cost-intensive.

Such components, or vehicle panels, to which the weld-on element can be welded, have a coating or a lubricant coating, applied for forming purposes. The lubricant layer is even more random if the vehicle panel has been in storage for a relatively long time because the lubricant coating is removed in some places due to gravity or for other reasons. For example, it is known to use drawing oil as a lubricant, sometimes leading to rapid drying out of the vehicle panels. DE 199 25 628 A1 proposes removing the lubricant coating before the actual welding process, by producing a cleaning current before the actual welding current, the cleaning current flowing via the weld-on element. This would form a lubricant-free welding zone. However, vehicle panels known as "dry" panels, which do not have a lubricant coating, are also increasingly being used.

Arcing occurs when the weld-elements have an elongated curved weld-on end. The arcs are unstable and break away from the panel and produce a weld of poor quality.

BRIEF SUMMARY OF THE INVENTION

According to the invention, a method for welding a weld-on element onto a component is provided, in which method, before the welding process, at least one of the parts being connected is wetted over the full area of its welding region with a wetting agent that can be applied uniformly in its layer thickness.

DETAILED DESCRIPTION OF THE INVENTION

The invention provides a method for welding a weld-on element onto a component, for example welding a weld-on element to a vehicle panel. The invention produced a stable arc. As a result, energy peaks seen in the prior art due to arcs breaking away are avoided and the component, or of the vehicle panel are not pierced by energy being introduced at an isolated point. The method and article according to the invention provides a weld that meets the particularly high quality requirements of vehicle construction. The vehicle panel consist of a material, for example, steel. Typical panels have a thickness of 0.8 mm or thinner. It goes without saying that the stated panel thickness should only be understood as by way of example. The method can of course also be carried out outside the vehicle industry. To this extent, the method is not only restricted to vehicle panels as the component. The component may also have a non-metallic layer, or the component may be galvanized.

The wetting agent may be applied either to the component, that is to say to the vehicle panel, or to the welding edge of the weld-on element. It is preferable that the wetting agent is applied to the component. It is preferable that the wetting agent is only applied in the region of the welding zone or in the welding region. The welding zone or the welding region is predetermined by the welding edge of the weld-on element. The wetting agent may extend somewhat over the region of the welding edge to protect these areas from welding spatter. In other applications, the wetting agent may be applied in the welding region covered by an inert-gas.

The wetting agent may be applied manually. One example if manual application is passing a cloth impregnated with the wetting agent passed over the welding zone. Other mechanical means of applying the welding agent result in a more uniform layer thickness. Uniform application of the welding agent may be done using a vaporizing nebulizer or some other suitable device. The wetting agent nebulizer may be manually operated, or activated by a control unit. When the wetting agent nebulizer is manually operated, it should discharge the same quantity of wetting agent each time it is operated. Manual nebulizers dispense wetting agent with each actuation of an actuating element of the nebulizer, known as "clicks." Each actuation, that is to say each "click," corresponds to a predetermined emerging quantity, which is applied directly to the welding region. Nebulizers operated by a control unit have the ability to ensure uniform application of wetting agent.

The wetting agent is applied in a layer thickness that is as uniform as possible. It was determined that for vehicle panels, the wetting agent having layer thickness between 0.8 $g/m^2$ and 1.2 $g/m^2$ produced satisfactory welds. The stated amounts are of course only by way of example, the layer thickness being dependent of course on the welding parameters, such as the thickness of the panel, galvanization or layer thickness of the galvanization, etc. For instance, it has been found that good welded connections, that is to say those that meet the requirements, could also be achieved with a layer thickness or a quantity of wetting agent comprising an amount of 2.0 $g/m^2$.

The vehicle panels may have been subjected to a forming process, for which reason the vehicle panels may be provided with a layer of lubricant, for example with a deep-drawing oil. The stated amounts for the layer thickness of the wetting agent relate in this case to panels that are completely free from oil, the panels merely having been wiped off to achieve the oil-free state of the panel. A dry vehicle panel may of course still have a small film of oil, for example comprising an amount of 0.3 to 0.4 gram per square meter [0.3 to 0.4 $g/m^2$].

Photo-optical inspection methods may identify the amount of lubricant present on the component. Based on this measured amount of lubricant, the invention determines the appropriate amount of wetting agent needed to produce a reliable weld. With the result of the measurement, the missing quantity of wetting agent in the welding region may be applied, for example by spraying. Either a minimum or an optimum quantify of wetting agent in the welding region is always present prior to welding. If of course an excess quantity of the layer of lubricant is established, the layer of lubricant may be removed. The area may be measured again and the appropriate quantity of wetting agent applied to the welding region.

In order to obtain completely dry vehicle panels or components, they could be worked with suitable means, for example with appropriate powders, which are subsequently removed, preferably without leaving any residue. It is also possible to blast the welding region almost free of oil or free of oil with pressurized air in order then to apply a defined quantity of wetting agent. Once the vehicle panel, or the welding region, to which the weld-on element is intended to be welded, has been cleaned of the residual lubrication oil, it will receive either a minimum or optimum amount of wetting agent to produce a quality weld. As previously stated, the optimum amount of wetting agent is dependent on various factors or welding parameters, it being required for the most favourable quantity to be empirically determined at least once for each welding task, and correspondingly filed or stored.

It is expedient if a drawing oil is applied as the wetting agent, the drawing oil of course having to satisfy the high requirements of the automobile industry. In other words, a drawing oil that has appropriate approval for the automobile manufacturers, which is stipulated in relevant national and/or international regulations, is applied. To this extent, the wetting agent nebulizer could be referred to as an oil nebulizer, the operating mode of which is not discussed any further.

The invention surprisingly shows that wetting the welding region with automotive drawing oil produces stable arcs in spite of the elongated design of the welding region (welding edge of the weld-on element), and achieves consistent reliable welds.

The invention may be practiced either by removing re residual lubrication oil normally and applying a uniform layer of wetting agent, or alternatively, measuring the amount of residual lubrication oil and as appropriate either removing the excess oil or applying additional wetting agent as determined by the measurement. This may take place automatically or manually. If possible, the layer thickness of the existing layer of lubricant should also be initially established. If the result of the measurement shows that the layer of lubricant is thinner than the thickness of the layer of wetting agent that is most favourable for the welding task, the lubricant is not removed and the required quantity of wetting agent applied.

By way of example, the wetting agent may be a drawing oil normally used in vehicle panel fabrication. For this purpose, the vehicle panel is transported to the wetting agent nebulizer or to the oil nebulizer (or the oil nebulizer is transported to the vehicle panel), the necessary quantitative amount of wetting agent is applied. Then the weld-on element is welded onto the vehicle panel.

The weld-on element may be such an element with a welding edge at the bottom and a functional region at the top, that is to say correspond to a WELDFAST® element. The invention produces repeatable welds. Wetting agent may be applied in an area beyond the welding zone to stabilize the arc on the elongated welding edge. An essential factor here is that it is not a random quantity of wetting agent that is applied, as may be the case for example when applying low-surface-tension water or highly volatile agents. Weld arc stabilization is achieved when a known, uniform layer of wetting agent is applied to the welding region, in automotive panel applications, at least 0.8 $g/m^2$ of draw oil.

With arc stabilization, very good welding quality may also be directly achieved, in particular in the case of the WELDFAST® elements, and therefore it has been possible to reduce manual repairs of defective welds considerably. The process may eliminate the need for costly inert-gas welding.

EXAMPLES

The welding method is preferably an electrical welding. The wetting agent used is a drawing oil having the advantage of a high initial resistance that is slowly reduced. The welding zone melting is achieved in a specifically selective manner. In particular, it has been found that the welding current may be reduced. By way of example, the welding current was reduced from 750 A to 700 A with a welding time of 160 ms in each case. Instances of piercing were observed in the case of a welding current of 750 A and a welding zone not wetted according to the invention. With a welding current of 700 A and a welding zone wetted according to the invention, a welded connection of a high quality was observed.

Further, particularly advantageous refinements of the invention are disclosed by the claims.

It should be pointed out that the features presented individually in the claims may be combined with one another in any technically meaningful way and show further refinements of the invention. The description additionally characterizes and specifies the invention.

The invention claimed is:

1. A method for welding a weld-on element onto a component comprising the step of applying a wetting agent only over a welding region of the component under the weld-on element to create a uniform layer of wetting agent prior to welding, the uniform layer being applied in a thickness to produce a stable welding arc, wherein the wetting agent provides a high initial resistance at initiation of the welding to reduce a welding current.

2. The method of claim 1, wherein the wetting agent is applied to a welding region on the weld-on element.

3. The method of claim 1, further comprising vaporizing the wetting agent with a wetting agent nebulizer.

4. The method of claim 1, wherein the wetting agent is applied in an amount of at least 0.8 g/m$^2$.

5. The method of claim 1, wherein the wetting agent is applied in an amount 1.2 g/m$^2$ or less.

6. The method of claim 1, further comprising cleaning welding region prior to the wetting agent application step.

7. The method of claim 1, further comprising measuring the welding region for the presence of lubricant and determining the appropriate quantity of wetting agent needed to produce a stable arc prior to the application step.

8. The method of claim 7, further comprising the step of removing lubricant when the lubricant measuring step identifies excess lubricant.

9. An automotive panel having a weld-on element welded thereto applied according to the method of claim 1, wherein the panel is not pierced by energy being introduced at an isolated point creating a defect.

10. The method of claim 1, wherein the wetting agent is a drawing oil.

11. The method of claim 1, wherein the wetting agent is applied by spraying.

* * * * *